United States Patent [19]

Schmitz

[11] Patent Number: 4,486,688
[45] Date of Patent: Dec. 4, 1984

[54] METHOD AND ARRANGEMENT FOR REGULTING A PATH LENGTH IN DEPENDENCE UPON A VARIABLE CONTROL VALUE

[75] Inventor: Eckehard Schmitz, Mönchengiadbach, Fed. Rep. of Germany

[73] Assignee: Pierburg GmbH & Co. KG, Neuss, Fed. Rep. of Germany

[21] Appl. No.: 349,694

[22] Filed: Feb. 17, 1982

[30] Foreign Application Priority Data

Feb. 21, 1981 [DE] Fed. Rep. of Germany ....... 3106479

[51] Int. Cl.³ .............................................. B60Q 1/10
[52] U.S. Cl. ................................. 315/83; 280/DIG. 1; 307/10 LS; 362/71; 362/272; 362/276; 362/420; 362/428
[58] Field of Search ....................... 362/38, 61, 63, 65, 362/66, 67, 71, 188, 233, 234, 238, 239, 250, 253, 259, 270, 271, 272, 276, 277, 282, 285, 287, 319, 322, 323, 324, 372, 418, 420, 427, 428; 307/10 LS; 280/6 R, 6 H, DIG. 1; 361/139, 170; 318/592, 594, 597, 624, 638, 663; 324/158 SM; 340/136, 691, 52 R; 315/77, 82, 83

[56] References Cited

U.S. PATENT DOCUMENTS

| | | | |
|---|---|---|---|
| 3,634,677 | 1/1972 | Wolffing et al. | 362/71 |
| 4,162,424 | 7/1979 | Zillgitt et al. | 307/10 LS |
| 4,293,893 | 10/1981 | Tsuzuki et al. | 362/38 |

FOREIGN PATENT DOCUMENTS 2117731 10/1972 Fed. Rep. of Germany ... 307/10 LS

OTHER PUBLICATIONS

"18037-Vehicle Head Lamp Axis Automatic Control", No. 180, Research Disclosure, Apr. 1979, pp. 176–177.

Primary Examiner—David H. Brown
Assistant Examiner—John E. Griffiths, Jr.
Attorney, Agent, or Firm—Max Fogiel

[57] ABSTRACT

A method and an arrangement are disclosed for regulating a path length defined by a pressure-responsive unit. Whenever a coarse positional adjustment has been made, a pause period is made to elapse before a fine adjustment (if any) is carried out. This arrangement does not, due to the pause period, require any accommodation or tuning to regulating stages having different decay behaviors.

12 Claims, 3 Drawing Figures

METHOD AND ARRANGEMENT FOR REGULTING A PATH LENGTH IN DEPENDENCE UPON A VARIABLE CONTROL VALUE

BACKGROUND OF THE INVENTION

The present invention relates to the regulation of a path length, i.e. the distance through which an object is displaced.

More particularly, the invention relates to a method of regulating a path length in dependence upon a variable control value.

The invention also relates to an arrangement for carrying the aforementioned method into effect.

A regulating method and arrangement of the general type here under discussion are disclosed in "Programminformation" (Hartmann & Braun, April 1977, Page 49, FIG. 6) which describes an electro-pneumatic position regulator designated IZIS. This regulator converts a control value, which is furnished as a variable electrical input signal, into a proportional path length or a proportional valve cross-section opening, respectively. The regulator essentially consists of a path-length furnishing unit, a differential amplifier, a current/pressure converter with a subsequent pressure amplifier and a pressure-responsive setting device which controls the opening of the valve cross-section. The differential amplifier is supplied with an input current proportional voltage as well as with a voltage which is derived from the path-length furnishing unit and which corresponds to the momentary valve position. The output signal of the current-to-pressure converter which is arranged subsequent to the differential amplifier, is converted into a pressure signal suitable for controlling the setting device, by the pressure amplifier.

A problem with this prior art construction is that the stability of the regulating circuit is determined by the dynamic behavior of the regulating stage. This makes it necessary in each instance to carry out an individual adaptation of the regulator to the regulating circuit which, in turn, means that the use of the arrangement with other regulating stages is often impossible, at least not without significant adjustment work.

SUMMARY OF THE INVENTION

Accordingly, it is an object of the present invention to overcome the disadvantages of the prior art.

A more particular object is to provide an improved regulating method of the type under discussion, which is not subject to the prior-art drawbacks.

Another object is to provide an improved arrangement for carrying the improved method into effect.

Still further objects of the invention are to provide the aforementioned improved method and arrangement in such manner that they are simple and relatively inexpensive to employ, and permit a stable regulation to be carried out independently of the transitional behavior of the regulating stage.

In keeping with these objects, and with still others which will become apparent hereafter, one aspect of the invention resides in a method of controlling a regulating device by supplying a comparator with a path-length input signal from a pressure-responsive unit and with a variable input signal control signal. Briefly stated, such a method may comprise the steps of forming a comparator output signal from the input signals, alternately applying pressure to the unit from two differential pressure sources in dependence upon the output signal and if a clear signal is present at the same time, determining the absolute signal difference between the two input signals, and utilizing the absolute signal difference to produce the aforementioned clear signal as long as this difference is greater than the higher of two predetermined threshold values and thereafter is still greater than the lower of these two threshold values.

If the absolute signal difference drops below the lower threshold value and then increases again to above the same, another clear signal is produced only after the elapse of a first time period corresponding to the decay time of the system and for the duration of a second time period which is dependent upon the magnitude of the absolute signal difference.

Thus, given a sufficiently large difference between the electrical input signals, e.g. a significant jump in the magnitude of the control value, the setting device of the system is controlled in the sense of properly resetting it, until a permissible regulating deviation of the electrical input signals has been reached; this may be considered to be a "coarse" adjustment. It is followed by a "fine" adjustment if the permissible regulating deviation is exceeded by overcompensation of the circuit. If this takes place, it triggers the initiation of a pause which takes into account the decay behavior of the regulating stage and at the end of which a clear-signal is produced which effects the "fine" adjustment. The time duration of this fine-adjusting clear signal depends upon the magnitude of the actual regulating deviation which exists at the elapse of the pause.

It is clear from the above that a decay of the regulating stage can take place during the pause without a concomitant reaction by the regulator of the system, which might result in an astable behavior overall. The magnitude of the actual regulating deviation is determined only after elapse of the pause and is then used to produce the fine-regulating clear signal of corresponding time duration. Thus, while the fine-adjusting clear signal is and can be produced only after elapse of the pause, it is possible at all times within the duration of the pause (for example in the event of a new sufficiently large jump in the magnitude of the control value) for another "coarse" adjustment to take place until signal values drop below a permissible regulating deviation. Because of the pause which is provided for between the coarse and fine adjustments, the present invention requires no special adaptation of the regulator to the regulating stage although it is, of course, advantageous for the regulating stage to be allowed to achieve substantial decay after coarse adjustment and within the pause. Thus, the method according to the present invention is capable of easy and widely varied application and possesses great simplicity.

It is currently preferred to make the magnitude of time of the clear signal used for fine adjustment, proportional to the magnitude of the absolute signal difference. Other relationships can, of course, be chosen; however, the one just mentioned has the advantage that in connection with a control of electromagnetic valves it results in an optimum regulation. The greater the absolute signal difference at the end of the pause, the longer should be the time duration of the fine-adjustment clear signal, to assure a quick drop below the permissible regulating deviation.

According to a further embodiment it is proposed to suppress the fine-adjustment clear signal if the absolute signal difference is again below the lower threshold value at the elapse of the pause. This is advantageous if the pause is sufficiently long, since the regulating value is already within the permissible deviation and an additional fine adjustment is not necessary. In fact, a fine adjustment made under these circumstances could cause the regulating value—which is just still within the permissible deviation range—to move out of this range and thus cause an instability in the system.

An arrangement or regulating system for carrying the aforementioned method into effect may comprise a pressure-operated path-defining unit, a pair of differential sources of pressure which are both connected with the unit, and alternately operable electro-magnetic valves interposed between the unit and the respective pressure source. The system may further include a first comparator having inputs and an output, a direction-indicator having first and second AND gates for alternately controlling the valves, the AND gates having first inputs one of which is connected directly with the output of the comparator and the other is connected with said output via an inverter and the AND gates also having second inputs jointly connected to a clear-signal generator. A differential-signal circuit has an output and, like the first comparator, receives electrical path-length and control input signals from the unit and from a variable reference-signal generator. A hysteresis switch is connected with its input to the output of the differential-signal circuit and with its output to the second inputs of the AND gates and having a higher switch-on and a lower switch-off threshold-value for producing a clear signal. A second comparator has one input connected to receive a signal equalling the lower threshold-value and another input connected with the output of the differential-signal circuit; in addition, the second comparator has an output. A time-delay element is connected with the output of the second comparator for producing a pause signal which in the event of rising absolute signal difference at the output of the differential-signal circuit is initiated when signal equality exists at the inputs of the second comparator with the lower threshold-value signal and which on termination triggers a clear-signal timer for producing another clear signal having a time duration which depends in its magnitude upon the momentary value of the absolute signal difference.

An arrangement as outlined is relatively simple in its construction but assures proper effectuation of the novel method.

Due to the respective deviations between the path-length signal and the control signal, the direction indicator is prepared for operation in the proper adjustment direction and is finally released when the appropriate clear signal is generated during coarse or fine adjustment. The clear signal for the coarse adjustment is produced by the differential-signal circuit and the hysteresis switch, whereas the fine-adjusting second clear signal—which is time-variable—is produced by the differential-signal circuit and the further or second comparator in conjunction with the time-delay element and the clear-signal timer after elapse of the predetermined pause. All of the components of the arrangement outlined above are simple, inexpensive and resistant to malfunction; moreover, their connection into a system or arrangement is also simple and readily reviewable. The path-length defining signal can be rapidly and with stability adjusted without any problems of stability and without adaptation of the regulator, independently of the value and sign of any change in the control signal.

According to a further embodiment a sample-and-hold circuit can be connected to the output of the differential-signal circuit, a voltage-controlled monostable flip-flop may be connected to the output of the sample-and-hold circuit and serve as the clear-signal timer, and control connections will then be provided for connecting the triggering inputs of the sample-and-hold circuit and the flip-flop with a triggering output of the time-delay element which is constructed as a flip-flop output that is triggered on termination of the pause. Accordingly, the absolute signal difference present at the end of the pause is stored and is then converted into a time-proportional clear signal in simple manner via the voltage-controlled monostable flip-flop. It may be advantageous, in this connection, to provide an OR gate which connects the trigger input of the clear-signal timer with the triggering output of the time-delay element and with the output of the second comparator. This assures that the clear-signal timer is triggered to produce a clear signal, only if the absolute signal difference of the electrical input signals is at the termination of the pause either still—or again—greater than the permissible regulation deviation. If the absolute signal difference drops below this deviation at or by the end of the pause, then the output signal of the time-delay element cannot trigger the clear-signal timer and in this event the clear signal is suppressed, a factor which improves regulating stability.

According to still another embodiment, a third AND gate may be provided which receives at its first input the clear signal from the clear-signal timer and at its second input a blocking-signal corresponding to the pause signal and originating with the time-delay element; the output of this third AND gate is connected, together with the output of the hysteresis switch, to the second inputs of the first and second AND gates via an OR gate. This construction assures that a fine-adjusting clear signal cannot under any circumstances reach the direction indicator after the time-delay element has been triggered and during the duration of the pause, independently of what happens during the pause in respect of the absolute signal difference and the output signal of the second comparator. In principle, the clear-signal generator could be triggered repeatedly during the pause by the output of the second comparator via the OR gate, but the output signal of the clear-signal generator cannot pass the blocked third AND gate. Thus, this embodiment incorporates a safety measure to suppress interference during the pause.

A currently preferred practical embodiment further comprises for each of the aforementioned electromagnetic valves an additional electromagnetic valve connected in parallel thereto and having a comparatively large valve-opening cross-section. An additional direction-indicator structurally equalling the first direction-indicator alternately triggers these valves and has inputs which are connected with the inputs of the first-mentioned direction-indicator; the second inputs of the AND gates of the second direction-indicator are connected to the output of the hysteresis switch. The two direction-indicators thus assure, during the coarse adjustment, that the respectively parallel-connected valves are triggered simultaneously. During fine adjustment, on the other hand, the clear signal from the clear-signal timer is supplied only to one of the two direction-indicators, so that the large cross-section valves remain closed.

According to another preferred embodiment a pressure-responsive setting unit is used, having a diaphragm box with a spring-loaded diaphragm which separates the interior of the box into a vented chamber located one side of the diaphragm and a working chamber located at the other side of the diaphragm and connectable with the two pressure sources via the electromagnetic valves. Such a setting unit is known per se in the art and has the advantage that it is reliable, accurate, fast and operates with sufficient setting force to be of use in the present system.

The invention will hereafter be described with reference to exemplary embodiments as illustrated in the appended drawings. It is to be understood, however, that this is merely for purposes of explanation and that these descriptions are not to be considered limiting in any sense.

DESCRIPTION OF PREFERRED EMBODIMENTS

Figure 1:
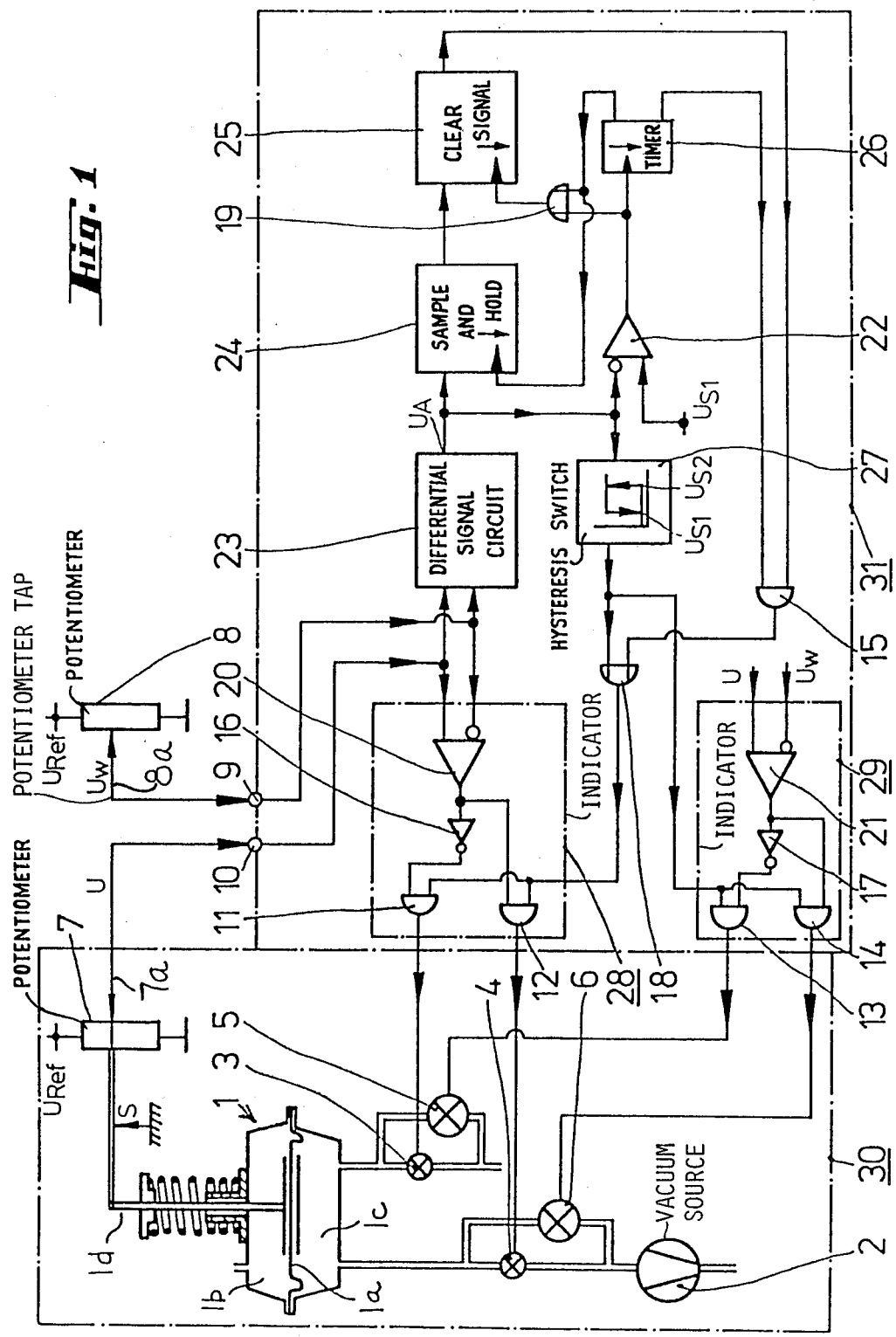
FIG. 1 is a diagrammatic view, showing the circuit connection of an arrangement according to the present invention.

As illustrated in FIG. 1, the system or arrangement according to the invention includes a pressure-responsive setting unit 1, here in form of a diaphragm-box having a housing the interior of which is subdivided by a spring-loaded diaphragm 1a into a vented chamber 1b at one side of the diaphragm and a working chamber 1c at the other side thereof. The diaphragm 1a is connected with an actuating rod 1d and constitutes the setting element which predetermines the length of a path S.

Working chamber 1c may be vented via an electromagnetic valve 3 having a small valve cross-section and via a thereto parallel electromagnetic valve 5 having a larger valve cross-section. The working chamber can also be connected with a source 2 of underpressure (vacuum) via an electromagnetic valve 4 having a small valve cross-section and a thereto parallel electromagnetic valve 6 having a larger valve cross-section. The actuating rod 1d is mechanically connected with the movable tap 7a of a potentiometer 7 which is connected to a reference voltage $U_{REF}$ and which constitutes an electrical path-defining element. An electrical input signal U is formed at the tap 7a as the control signal for a regulator which is designated in toto with reference numeral 31. This regulator 31 controls the operation of the setting device (including unit 1), which is designated in toto with reference numeral 30.

An additional electrical path-defining element is constituted by another potentiometer 8 which is also connected to the reference voltage $U_{REF}$ and which produces at its tap 8a an electrical input signal $U_W$ as the reference signal for the regulator 31.

The signals $U_W$ and U are supplied to the regulator 31 via inputs 9, 10 and then fed to a direction-indicator 28. Signal U passes to a non-inverting input of a comparator 20, whereas signal $U_W$ is passed to the inverting input of the same comparator. The output of comparator 20 is connected via an inverter 16 with the first input of a first AND gate 11; it is also directly connected with the first input of a second AND gate 12. Second inputs of the AND gates are connected with one another and, in addition, with the output of an OR gate 18 whose function will be described later. The AND gate 11 controls the operation of the valve 3 whereas the AND gate 12 controls the operation of the valve 4.

The signals U and $U_W$ are also at the same time supplied to the inputs of a differential-signal circuit 23 which produces an output signal $U_A$ corresponding to the absolute difference between the electrical input signals. This output signal is fed to the input of a hysteresis switch 27, the output of which is connected via the aforementioned OR gate 18 with the second inputs of the first and second AND gates 11 and 12. The hysteresis switch 27 produces at its output a clear signal whenever the absolute signal difference $U_A$ is greater than a first (higher) threshold value $U_{S2}$ and, even it drops below the same, is still higher than a second (lower) threshold value $U_{S1}$. The second threshold value corresponds to the permissible regulating deviation. Accordingly, the valve 3 or 4 will be opened—in dependence upon the sign of the actual regulating deviation and after a sufficiently high jump in the magnitude of the signal $U_W$—until a drop of the actual regulating deviation takes place below the permissible regulating deviation (respectively below the second threshold value $U_{S1}$). This is what may be considered the "coarse adjustment" of the system.

In the illustrated embodiment the opening of the valve 3 or 4 also involves simultaneous opening of the corresponding parallel valve 5 or 6, in order to carry out the coarse adjustment as rapidly as possible. For this purpose the invention provides a second direction-indicator 29 which is structurally the same as the indicator 28 (the latter is known per se from the art). A second comparator 21 is also provided, corresponding to the comparator 20 (both known per se from the art) and receives the signals U and $U_W$ at its input. The output of comparator 21 is connected via an inverter 17 with a first input of an AND gate 13; it is also directly connected with the first input of an AND gate 14. Second inputs of these AND gates 13 and 14 are connected with one another and also with the output of the hysteresis switch 27. The AND gate 13 controls the operation of valve 5 and the AND gate 14 controls the operation of valve 6. Thus, valves 3, 5 or 4, 6 are always simultaneously actuated during the coarse-adjustment operation.

The absolute signal difference value $U_A$ is also supplied from the output of circuit 23 to an input of a sample-and-hold circuit 24, as well as to an inverting input of still another comparator 22; the second threshold value $U_{S1}$ is fed to the non-inverting input of this same comparator 22. The output of comparator 22 is connected with the trigger input of a time-delay element 26 in form of a monostable flip-flop. The element 26 can be triggered only if the absolute signal difference, which is initially smaller than the permissible regulating deviation, rises to a magnitude greater than this permissible deviation. If this occurs, a negative impulse flank will appear at the output of the comparator 22 and thereupon the element 26 produces at an output which is connected with an input of an AND gate 15, a negative blocking pulse (pause signal) of defined length. This pulse assures that for the duration of the pause no clear signals can reach the direction-indicator 28 via the AND gate 15 which is connected with its output to an input of the OR gate 18. The pause length (which may be adjustable) is constant and is so selected that it permits an at least substantial decay of the circuit.

The element 26 has another output at which, simultaneously with generation of the aforementioned negative pause pulse, a positive pause pulse is produced; this is supplied to a trigger input of the sample-and-hold circuit 24 as well as to one input of an OR gate 19, the other input of which is connected to the output of comparator 22. The output of OR gate 19 is connected with the trigger input of a clear-signal generator 25 which is constructed as a voltage-controlled monostable flip-flop and whose input is connected to the output of the sample-and-hold circuit 24. When the generator 25 is triggered its output carries a positive clear signal; this output is connected with another input of the AND gate 15.

When the actual regulating deviation becomes greater than the permissible regulating deviation, the time-delay element or timer 26 is triggered and this causes the AND gate 15 to be blocked for the duration of the pause. After expiration of the pause the negative pulse flank at the output of the timer 26 causes the sample-and-hold circuit 24 to accept and store the momentary absolute signal difference $U_A$; at the same time the generator 25 is triggered so that a positive clear signal is generated at the output thereof, the time duration of which signal depends upon the magnitude of the stored momentary absolute signal difference and which is preferably proportional thereto. This clear signal is fed to the second inputs of the AND gates in the direction-indicator 28, so that the valves 3 or 4 are opened to effect fine adjustment, the valves being maintained open the longer, the greater the absolute signal difference at the end of the pause duration.

The absolute signal difference $U_A$ may be smaller at the end of the pause duration than the permissible regulating deviation (i.e. the second threshold value $U_{S1}$); if so, the positive output signal of comparator 22 blocks the trigger input of generator 25 via the OR gate 19, so that the negative pulse flank at the output of timer 26 cannot start operation of the generator 25.

THE OPERATION

Figure 2:
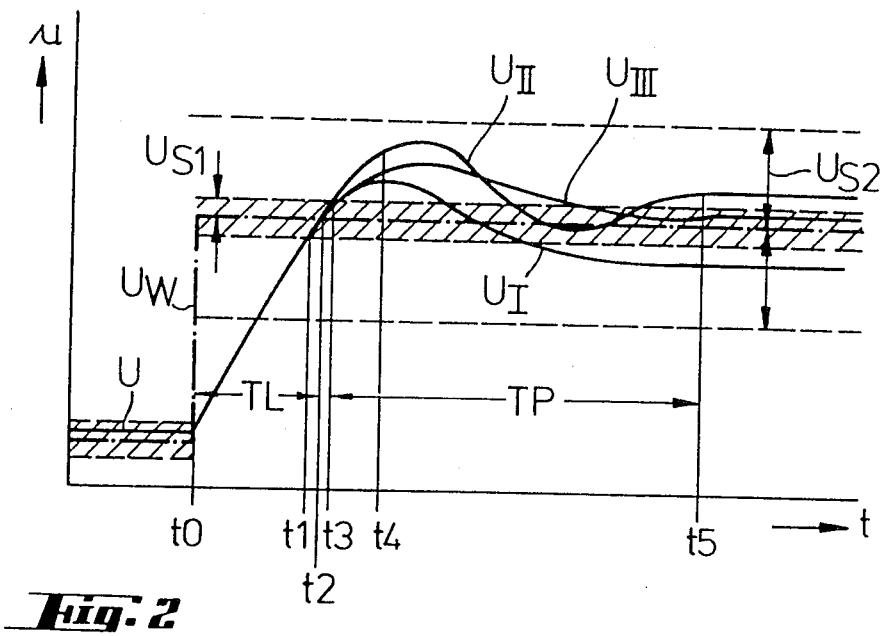
FIG. 2 is a diagram illustrating the regulating episodes which occur in such a system.

In the arrangement of FIG. 1, assuming that the value $U_W$ jumps as indicated in FIG. 2, then the output signals of the comparators 20 and 21 of the direction-indicators 28 and 29 become negative. This means that only the first AND gates 11 and 13 are prepared for opening the valves 3 and 5. If the jump in the magnitude of value $U_W$ is so large (as shown in FIG. 2) that the first threshold value $U_{S2}$ is exceeded, the hysteresis switch 27 is triggered and the AND gates 11 and 13 are thereby finally unblocked, so that the pressure-responsive unit 1 can be vented, causing the diaphragm 1a to move upwardly and the path length S to be increased. The value U follows the value $U_W$ quickly, beginning with the time $t_0$ shown in FIG. 2, due to the large valve cross-section of the valves 3, 5. The actual regulating deviation becomes smaller than the permissible deviation (i.e. the second threshold value $U_{S1}$), beginning with the time $t_1$ shown in FIG. 2, so that the coarse adjustment operation is terminated due to the disappearance of the output signal from hysteresis switch 27.

Once the coarse adjustment is completed at time $t_1$ a further adjustment takes place, depending upon the structural characteristics of the unit 1. At the time $t_2$ the value U corresponds exactly to the value $U_W$ and then U becomes greater than the value $U_W$. In the time period between $t_1$ and $t_3$ the output signal of the comparator 22 is positive; it becomes negative at the time $t_3$ so that the triggering requirements for the element 26 are now met. Accordingly, the pause duration TP begins at the time $t_3$, and then the value of signal U begins to decline at about the time $t_4$.

FIG. 2 illustrates three possible conditions for the regulating (control) signal in the event of a missing fine adjustment. The value $U_I$ passes through the double tolerance range of the permissible regulating deviation in the reversed sense and at the end of the pause duration $T_P$ (i.e. at the time $t_5$) assumes a stationary value at which the absolute signal difference is greater than the permissible regulating deviation (i.e. the threshold value $U_{S1}$) but smaller than the threshold value $U_{S2}$. A second possibility is for the regulating value $U_{II}$ to enter into the double tolerance range of the permissible regulating deviation but to assume a stationary value at the time $t_5$ at which the absolute signal difference is greater than the threshold value $U_{S1}$ and smaller than the threshold value $U_{S2}$. In both of these cases it is impossible for a renewed coarse adjustment to take place. The third possibility is for the regulating value $U_{III}$ to enter into the double tolerance range of the permissible regulating deviation without leaving it again. In this instance no further fine adjustment is necessary for the value $U_{III}$ whereas the values $U_I$ and $U_{II}$ require a subsequent fine adjustment at the end of the time period $T_P$ (beginning at time $t_5$) so that the stationary values of the regulating value will fall into the double tolerance range of the permissible regulating deviation.

After elapse of the pause period $T_P$ the sample-and-hold circuit 24 stores the absolute signal difference between the values $U_W$ and U. In conjunction with the values $U_I$ and $U_{II}$ this signal difference serves to influence the time-variable clear signal of the voltage-controlled element 25. In the case of the value $U_{III}$ the triggering of the element 25 is suppressed. The time duration of the clear signal for the values $U_I$ and $U_{II}$ may be about equally long, since the direction is preset in the direction-indicator 28 for influencing the unit 1. In the case of $U_I$ the value of the same at the time $t_5$ is smaller than the value of signal $U_W$, so that the valve 3 is opened. Similarly, the valve 4 is opened at the time $t_5$ in the case of value $U_{II}$. These time-variable opening operations in the correct displacement sense assure that the values $U_I$ and $U_{II}$ will finally enter into the double tolerance range of the permissible regulating deviation, taking into account the fine adjustment beginning at the time $t_5$. Should the regulating value move out of the double tolerance range at a later time, a further fine adjustment will take place. Should the absolute signal difference be even greater than the threshold value $U_{S2}$, this will trigger a further coarse adjustment.

The valves 3, 5 and 4, 6 remain closed if the magnitude of signal U is equal to that of the signal $U_W$. During the clear signal originating in the element 25 the direction-indicator 28 can effect a switch-over between the valves 3 and 4, in the event that during this time period the sign of the signal difference between the signal U and the signal $U_W$ changes.

In highly developed positioning systems provision is usually made to take into account the transitional behavior of the path-proportional values $U_I$, $U_{II}$ and $U_{III}$ (illustrated in FIG. 2 in conjunction with a positive jump in the value $U_W$) by tuning the regulator to the behavior of a specific device. The present invention makes this superfluous, so that several regulating stages having different decay characteristics can be operated with one and the same regulator. This is a decisive advantage over the known state of the art and is achieved by use of the defined pause period $T_P$ after the first passage through the double tolerance range at the time $t_3$. A variable, fine-adjusting clear signal is supplied to the direction-indicator 28 only after elapse of the pause period $T_P$.

The large cross-section valves 5 and 6 permit the time TL elapsing between the two times $t_0$ amd $t_2$ to be shortened. If this is not necessary or not desired, then the valves 5, 6 and their associated direction-indicator 29 may be omitted from the arrangement.

Figure 3:
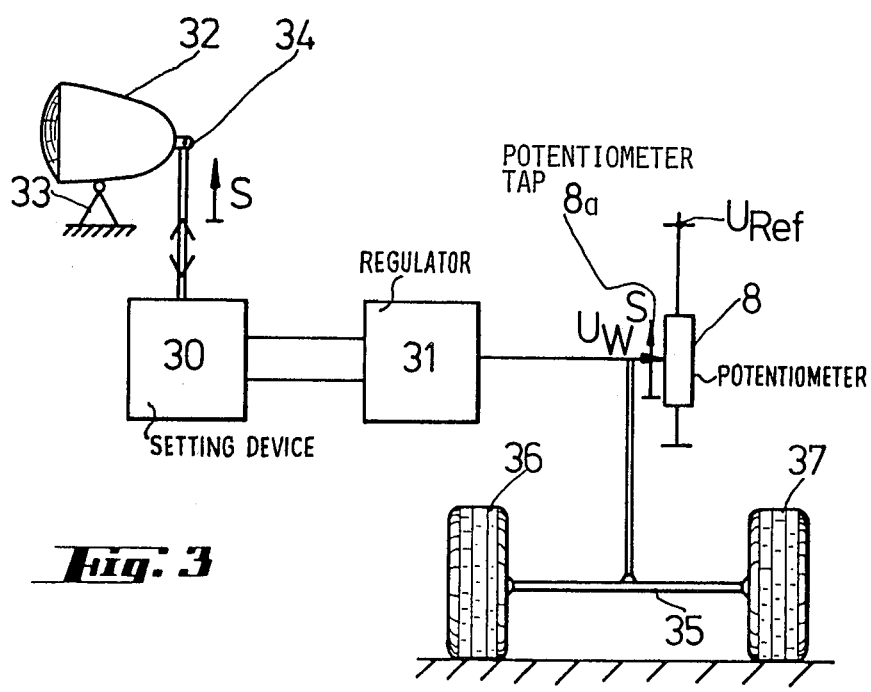
FIG. 3 is a partly diagrammatic, partly perspective illustration explaining the use of the invention in the context of a specific practical embodiment.

The arrangement according to the present invention can be used with particular advantage for regulating the position of a vehicle headlamp 32 as indicated in FIG. 3. The latter is articulately mounted on a mounting location 33 of the vehicle body or chassis and is articulately connected at 34 with the actuating rod $1_d$ (see FIG. 1) of the setting device 30 which, in turn, is mounted on e.g. the vehicle body. The setting device supplies the regulator 31 with the signal value U in form of an electrical input signal, while the regulator 31 controls the setting device in the directional sense, as described hereinbefore. Thus, the headlamp 32 can be tilted about the mounting location 33 in accordance with swinging or other movements of the vehicle body to assure that the beam distance of the lamp is maintained constant.

The vehicle has an axle 35 on which wheels 36, 37 are mounted. The axle 35 is mechanically and rigidly connected with the movable tap 8a of the potentiometer 8 which is mounted on e.g. the vehicle body. Tap 8a is electrically connected to the input of regulator 31 to supply the same with the path-proportional signal $U_W$ corresponding to the vehicle body movements (e.g. due to contraction of the vehicle springs and/or shock absorbers). If axle 35 is the rear vehicle axle and the path-proportional value $U_W$ increases with increasing vehicle load, then the headlamp 32 is automatically tilted in downward direction by increasing of the path length S, so that the proper road illumination distance ahead of the vehicle is maintained, respectively adjusted to the correct value.

It will be appreciated that the specific embodiment of the arrangement as shown in FIG. 1, and the specific application as shown in FIG. 3, are both by way of example only and not to be considered limiting. Many modifications can be made without departing from the spirit and intent of the invention. What is important in the context of the invention is that after a coarse adjustment has been made a pause period must elapse before a fine adjustment can take place. As for applications of the arrangement, it will be appreciated that in conjunction with vehicles the arrangement can for example be used to regulate waste-gas recycling valves, throttle flaps, automatic clutches and the like. However, the applications are of course not limited to the vehicle sector.

What is claimed is:

1. A method of controlling a regulating device by supplying a comparator with a path-length input signal from a pressure-responsive unit and with a variable input control signal, comprising the steps of: forming a comparator output signal from said input signals; determining the absolute signal difference between the two input signals; utilizing the absolute signal difference to produce a clear signal as long as this difference is greater than the higher of two predetermined threshold values and thereafter is still greater than the lower of said two threshold values; alternately applying pressure to said unit from two differential sources of pressure in dependence upon said output signal and if said clear signal is present at the same time; the absolute signal difference dropping below said lower threshold value, and then increasing to above the same; another clear signal being then produced only after elapse of a first time period corresponding to the decay time of the device and lasting for a second time period dependent upon the magnitude of the absolute signal difference.

2. A method as defined in claim 1, and further comprising the step of making said second period proportional to the magnitude of the absolute signal difference.

3. A method as defined in claim 1; and further comprising the step of suppressing said another clear signal if the absolute signal difference is below said second threshold value at the end of said first time period.

4. A method as defined in claim 1, wherein said pressure is applied to said unit via larger valve cross-section when said clear signal is present, and via smaller cross-section when said another clear signal is present.

5. A regulating system, comprising: a pressure-operated path-defining unit; a pair of differential sources of pressure, both connected with said unit; alternately operable electromagnetic valves interposed between said unit and the respective source; a first comparator having inputs and an output, said first comparator receiving electrical path-length and control input signals from said unit; a direction-indicator having first and second AND gates for alternately controlling said valves, said AND gates having first inputs one of which is connected directly with said output of the comparator and the other is connected with said output via an inverter, and also having second inputs jointly connected to a clear-signal generator; a differential-signal circuit having an output and receiving said electrical path-length and control input signals from said unit and from a variable reference-signal generator; a hysteresis switch connected with its input to the output of the differential-signal circuit and with its output to said second inputs of said AND gates and having a higher switch-on and a lower switch-off threshold-value for producing a clear signal; a second comparator having one input connected to receive a signal equalling said lower threshold-value and another input connected with said output of said differential-signal circuit, said second comparator having an output; and a time-delay element connected with said output of said second comparator for producing a pause signal which in the event of rising absolute signal difference at the output of the differential-signal circuit is initiated when signal equality exists at the inputs of the second comparator, said pause signal on termination triggering a clear-signal generator for producing another clear signal having a time duration which depends upon the momentary value of the absolute signal difference.

6. A regulating system as defined in claim 5, and further comprising a sample-and-hold circuit connected to said output of the differential-signal circuit, said clear-signal generator being a voltage-controlled monostable flip-flop connected with an output of said sample-and-hold circuit; and control means connecting respective triggering inputs of said sample-and-hold circuit and said flip-flop with a triggering output of the time delay element which is constructed as a flip-flop output that is triggered on termination of the pause signal.

7. A regulating system as defined in claim 6, wherein said control means comprises an OR gate connecting the triggering output of said time-delay element and said output of said second comparator with the triggering input of said clear-signal generator.

8. A regulating system as defined in claim 7, and further comprising an additional or third AND gate having a first input connected to receive said another clear signal from said clear signal generator, a second input connected to receive from said time-delay element a blocking signal corresponding to said pause signal, and an output connected together with the output of said hysteresis switch via an OR gate to said second inputs of said first and second AND gates.

9. A regulating system as defined in claim 8; and further comprising a pair of additional electromagnetic valves each connected in parallel with one of the first-mentioned valves and having a valve cross-section greater than that of the respective first-mentioned valve; a second direction-indicator, structurally equalling the first direction-indicator, for alternately selecting the additional valves and having its inputs connected with the inputs of the first-mentioned direction-indicator, said second direction-indicator having the second inputs of its AND gates connected to said output of said hysteresis switch.

10. A regulating system as defined in claim 9, said unit being a membrane box having a housing, a spring-loaded membrane in said housing and defining therein at one side of the membrane a vented chamber and at the other side a working chamber connected with said valves.

11. A regulating system as defined in claim 10; in combination with a vehicle body movable with reference to at least one vehicle axis and including a headlamp, said unit being connected between said body and said headlamp; first means for converting displacements of said unit into said electrical path-length input signal, said variable, reference-signal generator being second means for converting the relative positions of said body and vehicle axis into said electrical control input signal.

12. A regulating system as defined in claim 11, wherein said second means for converting the relative positions of said body and vehicle axis comprises an adjustable potentiometer mounted on said body and having a movable tap, means mechanically connecting said tap with said vehicle axis and means electrically connecting said tap with a regulating device of said system.

* * * * *